Oct. 19, 1926.  1,603,594

C. B. GRAY

CLUTCH

Filed March 14, 1923   8 Sheets-Sheet 1

Oct. 19, 1926.

C. B. GRAY

CLUTCH

Filed March 14, 1923

Patented Oct. 19, 1926.

1,603,594

UNITED STATES PATENT OFFICE.

CHARLES B. GRAY, OF PHILADELPHIA, PENNSYLVANIA.

CLUTCH.

Application filed March 14, 1923. Serial No. 625,142.

My improvement relates particularly to clutches to be used for transmitting power to the operating members in machines used for cutting or punching sheet-form material.

The object of the invention is to provide reliable means for controlling the action of the clutch.

A feature of the improvement relates to the limiting of a tool to a single movement or stroke for each movement of a pedal or other member actuated for putting the clutch into engagement.

In the accompanying drawings.

The machine bearing the clutch may be a machine for cutting sheet-form material, such as a punch or similar machine in which is a tool which is to make a single stroke. The machine may also be adapted for both punching and cutting by interchange of the tools. When a tool is put into a machine which is to make repeated reciprocations for cutting, the clutch mechanism is to be so adjusted as to permit the repeating of strokes of the tool. Thus the cutting machine having the reciprocatory cutter for cutting along a line may also be used as a punching machine by substituting punching tools for the cutting tools.

It may be further stated that this improved clutch is applicable to any machine in which a cutting tool or a punching tool or a similar tool is to make one stroke and no more while the sheet of material remains in the same position. For example, in punching sheet metal or a metal plate, if the punching tool is allowed to repeat the stroke, there is danger of movement of the sheet or plate between strokes and the tool during the second stroke cutting away a part of the metal which should not be cut.

A is a part of the body of such a machine. B is a shaft which is to receive motion through the clutch. C is a pulley made heavy enough to serve also as a fly wheel. This is loose on the shaft, B. On the wheel, C, is a clutch member, $C^1$, having in this case, three jaws, $C^2$. This clutch member is adapted to be engaged by the jaws, $D^5$, of the clutch member, D, which surrounds the shaft, B, between the wheel, C, and the frame, A, and is slidable lengthwise on said shaft by means of feather keys, $B^1$, in the usual manner. For convenience in description, movement of the clutch member, D, toward the clutch member, $C^1$, will be called "forward" movement, and movement in the opposite direction will be called "backward" movement.

The clutch mechanism is so organized as to include a pedal or other suitable means under the control of the operator for shifting the clutch member, D, into engagement with the clutch member, $C^1$, and to again shift the clutch member, D, out of engagement at the termination of or during one rotation of said clutch member and the shaft, B.

Two rollers, E, one of which is supported on the lower end of an arm, $E^1$, at one side of the frame, while the other of said rollers is similarly supported on a similar arm, $E^1$, at the other side of the frame press forward against the clutch member, D. The upper end of each such arm surrounds and is keyed to a horizontal, transverse rock-shaft, $E^2$, having a bearing, $A^2$, in the bracket, $A^1$, seated immovably on the upper face of the frame, A, and secured to the frame by means of four bolts, $A^3$. At one end of the shaft, $E^2$, an arm, $E^3$, extends horizontally from the upper part of the arm, $E^1$ in the direction opposite the clutch member, D. The arms, $E^3$ and $E^1$, together form a bell crank. Some downward pressure is constantly applied to the arm, $E^3$, by the expanding coiled spring, F, which surrounds the stem, $F^1$. The upper end of said stem has an eye, $F^2$, which extends into a fork, $F^3$, on an arm, $F^4$, which surrounds and is keyed to the horizontal rock shaft, $F^5$, which shaft is supported rotatably in bearings, $F^6$, rising from the bracket, $A^1$. The lower end of the stem, $F^1$, extends slidably through a bearing, $E^4$, in the outer end of the arm, $E^2$. Between the lower end of the spring, F, and the arm, $E^3$, is a washer, $F^7$, adapted to rock on the arm, $E^3$, during up and down movement of said arm. At the upper end of the spring, a washer, $F^8$, surrounds the stem, $F^1$; and above said washer two nuts, $F^9$, are threaded around said stem. By varying the position of these nuts, the tension of the spring may be varied; and by such variation the pressure of the rollers, E, on the clutch member, D, is varied. On the end of the rock shaft, $F^5$, opposite the arm, $F^4$, is an arm, $F^{10}$, to the outer end of which is coupled the upper end of an upright pedal rod, P. The lower end of said rod is coupled to a horizontal pedal bar, $P^1$, one end of which is hinged to the frame of the machine at $P^2$. On the opposite end of said bar is a pedal, $P^3$. By depressing said pedal, the rod, P, is drawn downward, whereby the arm, $F^{10}$, is also drawn downward. That causes the rocking of the shaft, $F^5$, whereby the arm, $F^4$, and the stem, $F^1$, and the nuts, $F^9$, and the washer, $F^8$, and the spring, F, are pressed downward. If at any time the clutch member, D, is out of engagement with the clutch member, C, and is so held by any other member of the structure, the arm, $E^1$, cannot be moved in the direction of the clutch member, D, and therefore the arm, $E^3$, can not be depresesd by downward pressure on the spring, F. But if the member of the structure which at the time is resisting movement of the clutch member, D, toward the clutch member, $C^1$, is released, then instantly the force exerted by the spring, F, depresses the arm, $E^3$, whereby both arms, $E^1$, move both rollers, E, to move the clutch member, D, and by such movement force the clutch member, D, into engagement with the clutch member, $C^1$.

It may be stated that the clutch member, D, is normally out of engagement. It is held in such position by the roller, G, which bears against the annular shoulder, $D^1$, when said clutch member is out of engagement. Said roller is mounted for rotation on the lower end of an upright cylindrical stem, $G^1$, which is slidable endwise in a bearing, $G^2$, in the bracket, $A^1$. The upper end of said stem is flattened and formed into an eye, $G^3$, which extends into a fork, $G^4$, which is formed on one end of a horizontal rocking lever, $G^5$, which loosely surrounds the rock shaft, $F^5$, between the bearings, $F^6$. A pintle, $g^4$, extends through the fork, $G^4$, and the eye, $G^3$. In the lower face of the opposite end of the lever, $G^5$, is formed a socket, $G^6$, in which rests the upper end of an expanding coiled spring, $G^7$. The lower end of said spring rests in a similar socket, $G^8$. Said spring acts constantly to tilt said lever for pushing the stem, $G^1$, and the roller, G, downward.

The lever, $G^5$, is tilted against the resistance of the spring, $G^7$, by means actuated when the arm, $F^{10}$, is drawn downward by the pedal rod, P. Formed integral with the arm, $F^{10}$, is an arm, $G^9$, which extends obliquely downward toward the hub of the wheel, C, and ends in a fork, $G^{10}$. The lower end of a latch member, $G^{11}$, extends into and is coupled to the fork, $G^{10}$. On the latch member, $G^{11}$, is a shoulder, $G^{12}$, which is adapted to bear upward against a stud, $G^{13}$, projecting horizontally from the adjacent part of the lever, $G^5$. Said stud is a continuation of a bolt-like member, $G^{14}$, which extends through the lever, $G^5$, and has adjacent the stud, $G^{13}$, a fixed collar, $G^{15}$, and has on its opposite end a nut, $G^{16}$. An expanding coiled spring, $G^{17}$, is placed between the latch member, $G^{11}$, and a shoulder, $G^{18}$, formed on the arm, $G^9$. Normally the spring, $G^{17}$, presses the latch member, $G^{11}$, toward the stud, $G^{13}$, so as to bring the shoulder, $G^{12}$, into position to engage the stud, $G^{13}$, when the arm, $G^{10}$, is moved upward during the downward movement of the arm, $F^{10}$, by the downward movement of the pedal rod, P.

When normal action of the latch member, $G^{11}$, is permitted, the shoulder, $G^{12}$, makes engagement with the stud, $G^{13}$, as often as the latch mechanism, $G^{11}$, moves upward, whereby the lever, $G^5$, is tilted and the stem, $G^1$, and the roller, G, are lifted, the latter moving high enough to clear the annular shoulder, $D^1$, and also to clear the cam, $D^2$, which is adjacent the shoulder, $D^1$, and is cylindrical and presents a working face, $D^3$, which comes approximately even with the shoulder, $D^1$, at only one point, preferably even with or projecting slightly across the shoulder, $D^1$, in order that the roller may readily slip down across the shoulder, $D^1$.

The clutch member, D, moves toward the wheel, C, only far enough to bring the part, $D^4$, and the extended part of the cam, $D^2$, under the roller, G, so that when the roller, G, is allowed to descend it will rest on the part, $D^4$, until the extended part of the face, $D^3$, bears against the roller whereby the clutch member, D, is pressed out of engagement with the clutch member, $C^1$. When the member, D, has been turned into that position the roller, G, if free to descend, moves downward into engagement with the annular shoulder, $D^1$. While the roller is in that position, the clutch member, D, again rests indefinitely without being permitted to shift into engagement with the clutch member, C, in response to the pressure of the spring, F.

Since the lifting of the roller, G, high enough to release the clutch member, D, proceeds simultaneously with the downward movement of the arm, $F^4$, whereby the spring, F, is compressed, it follows that spring pressure is accumulated ready for exertion when the roller, G, is high enough to be freed. By that means, quick and forcible endwise movement of the clutch member, D, is attained. In mechanism of this sort such quick or prompt movement is desirable.

The exterior or perimeter, $D^6$, of the part of the clutch member, D, which supports the jaws, $D^5$, is excentric. Hence that part of the clutch member, D, may be called an excentric.

To prevent the lever, $G^5$, from being tilted against the action of the spring, $G^{17}$, for lifting the roller, G, to allow the clutch member, D, to shift into engagement with the clutch member, $C^1$, the latch member, $G^{11}$, is to be pushed against the action of the spring, $G^{17}$, far enough to disengage the shoulder, $G^{12}$, from the stud, $G^{13}$. That is done by means of the rocking structure which will now be described.

A U-form member, H, has eyes, $H^1$, extending to opposite sides of the bracket, $A^1$. A horizontal bolt-form axle or wrist, $H^2$, extends through each of said eyes into the bracket to support the member, H, for rocking on said wrists. On the member, H, is a downward extension, $H^3$, which supports an axle, $H^4$, which is horizontal and parallel to the shaft, B. On said axle is a roller, $H^5$, which bears upon the face of the adjacent eccentric, $D^6$. An expanding coiled spring, $H^6$, is placed between the member, H, and a horizontal lug, $H^7$, on the bracket, $A^1$, and constantly tends to press the member, H, downward. On the part of the member, H, which is adjacent the latch member, $G^{11}$, an upright arm, $H^8$, is formed rigid with the U-form member, H. A bolt, $H^9$, is threaded horizontally through the upper end of the arm, $H^8$, in position to bear against the latch member, $G^{11}$, when the excentric, $D^6$, forces the roller, $H^5$, and the member, H, upward. The bolt, $H^9$ is to be so adjusted in the arm, $H^8$, as to force the shoulder, $G^{12}$, out of engagement with the stud, $G^{13}$, whereby the arm, $F^{10}$, may descent and the arm, $G^9$, and the latch member, $G^{11}$, may rise without tilting the lever, $G^5$, and thereby lifting the stem, $G^1$, and the roller, G.

When the roller, G, is in its lower position and the shoulder, $G^{12}$, is clear of and is above the stud, $G^{13}$, the operator may continue to hold the pedal and the pedal rod and the arm, $F^{10}$, down, whereby the latch member, $G^{11}$, remains in its upper position. That condition may continue indefinitely, the roller, G, and the stem, $G^1$, remaining in their lower position, the roller, G, being in engagement with the annular shoulder, $D^1$, whereby the clutch member, D, is held out of engagement with the clutch member, C, against the action of the spring, F. To again permit engagement of the clutch, the operator must release the pedal and allow the arm, $F^{10}$, to rise and the arm, $G^9$, and the latch member, $G^{11}$, to move downward far enough to cause the shoulder, $G^{12}$, to engage under the stud, $G^{13}$. When that has been done, the next downward movement of the pedal rod, P, and the arm, $F^{10}$, will cause the lifting of the stem, $G^1$, and the roller, G, high enough to allow the clutch member, D, to shift into engagement with the clutch member, C, through the action of the spring, F, which has been put under increased compression during the upward movement of the stem, $G^1$, and the roller, G.

Downward movement of the arm, $G^{10}$, and upward movement of the arm, $F^{10}$, are limited by an adjustable stop-screw, $G^{19}$, seated on the bracket, $A^1$, near the adjacent arm $E^1$.

The cam, $D^2$, is formed on a split ring which is composed of two sections, $D^7$, having ears, $D^8$, in which are seated binding bolts, $D^9$, the ears being far enough toward the arms, $E^1$, to avoid the roller, G. Within the ring and at the adjacent end of the body of the clutch member, D, said body has an annular rib, $D^{10}$, a part of which is notched to form rachet teeth, $D^{11}$. Within the ring is a recess, $D^{12}$, in which is a pawl, $D^{13}$, held by a fixed journal, $D^{14}$. The recess, $D^{12}$, is preferably so formed as to cause its wall to bear against the rear end of the pawl, whereby strain on the journal is avoided. This structure permits turning the ring into different positions on the clutch member body, whereby the time of action of the cam, $D^2$, is varied, or whereby the position of the cam, $D^2$, on the shaft, B, is varied. A spring, $D^{15}$, presses the pawl toward the ratchet teeth. A screw, $D^{16}$, retains the spring.

In this structure, the clutch member which is a part of or attached to the pulley may be regarded as the primary clutch member, while the slidable clutch member, D, may be regarded as the secondary clutch member.

The operation is as follows:—

Figure 1:
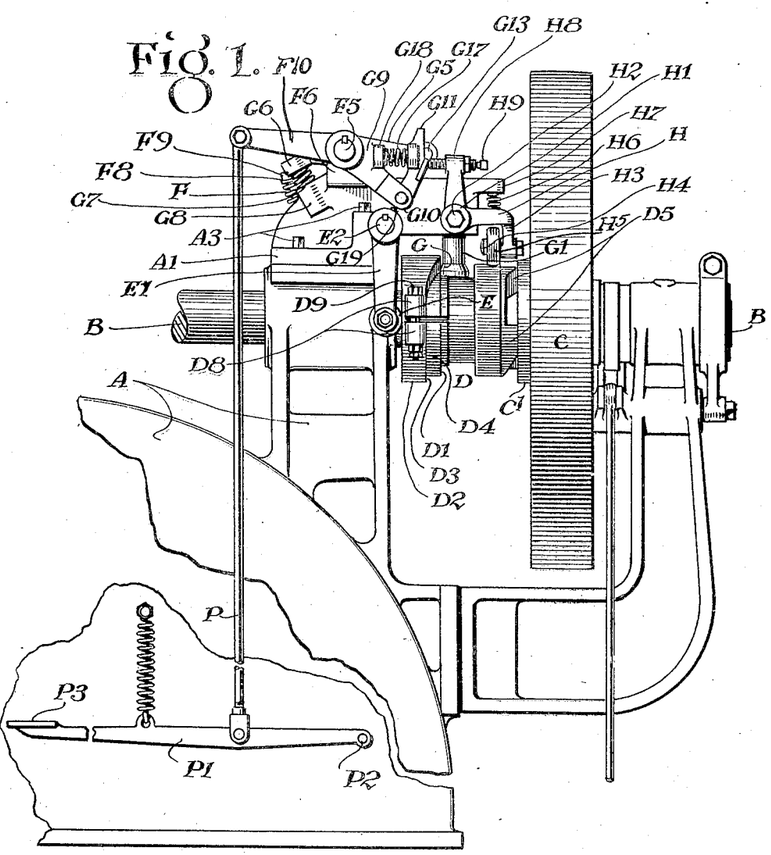
Fig. 1 is a front elevation of a part of a machine embodying my improvement.
Figure 2:
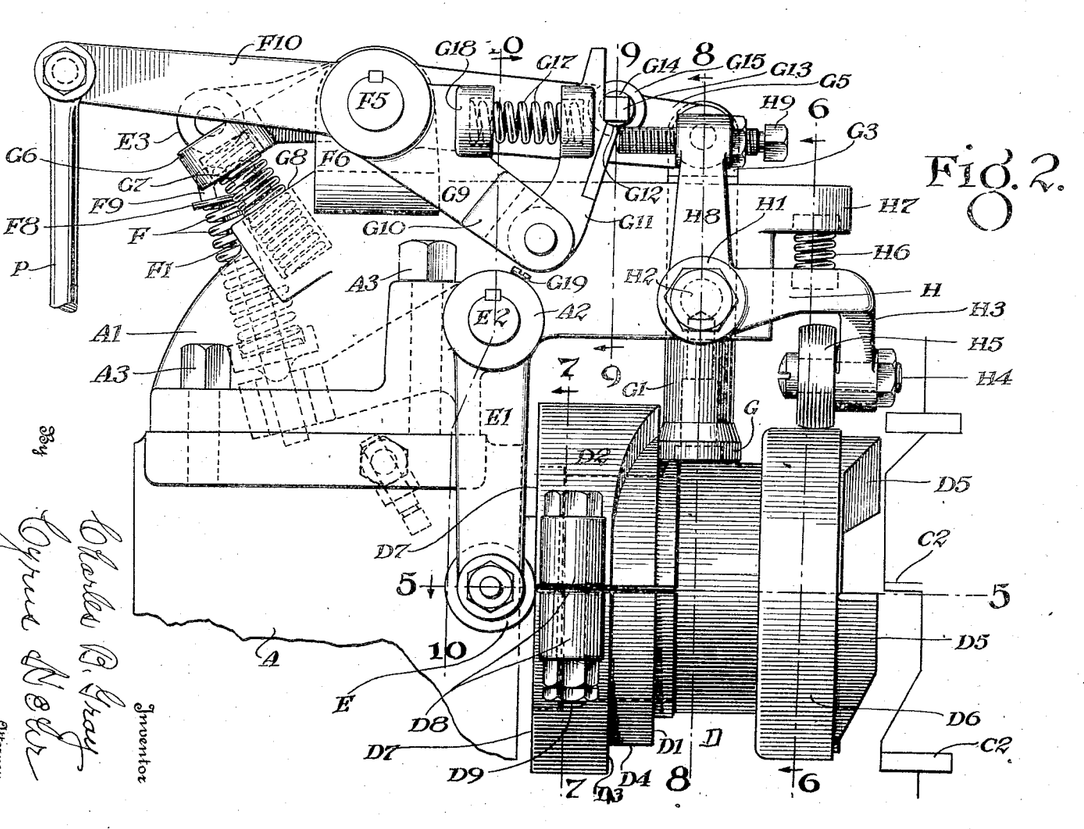
Fig. 2 is a larger front elevation of the clutch and associated parts shown in Fig. 1.
Figure 3:
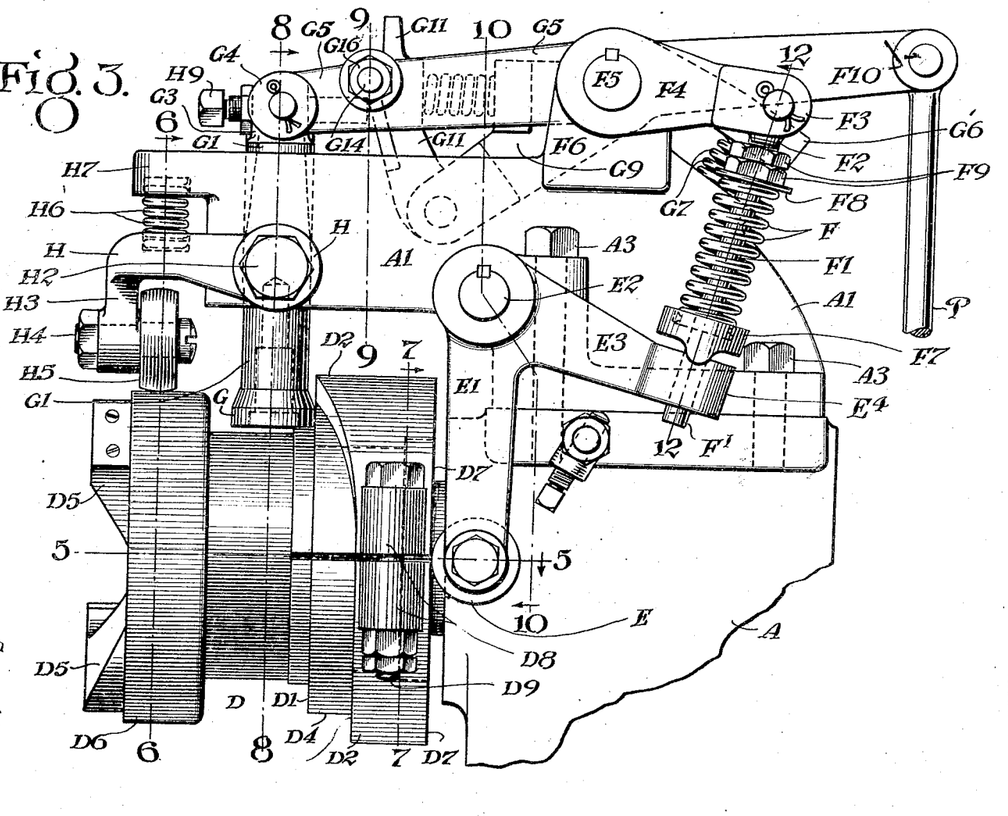
Fig. 3 is a rear elevation showing the parts shown by Fig. 2.
Figure 4:
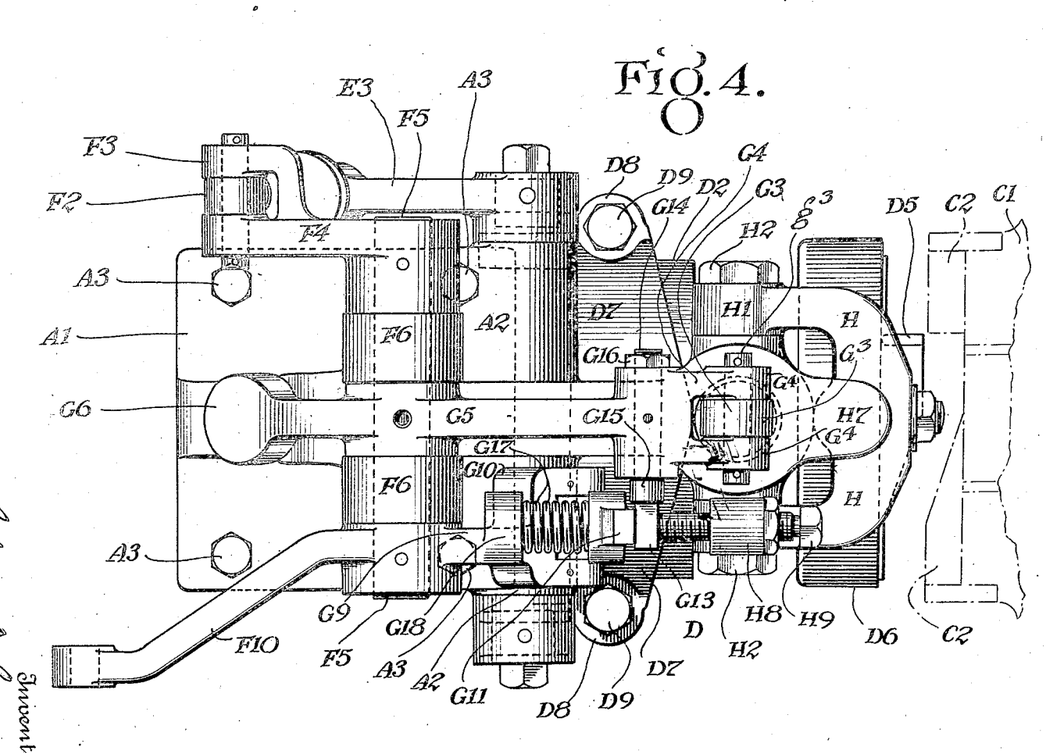
Fig. 4 is a plan of the mechanism shown by Figs. 2 and 3.
Figures 5, 6:
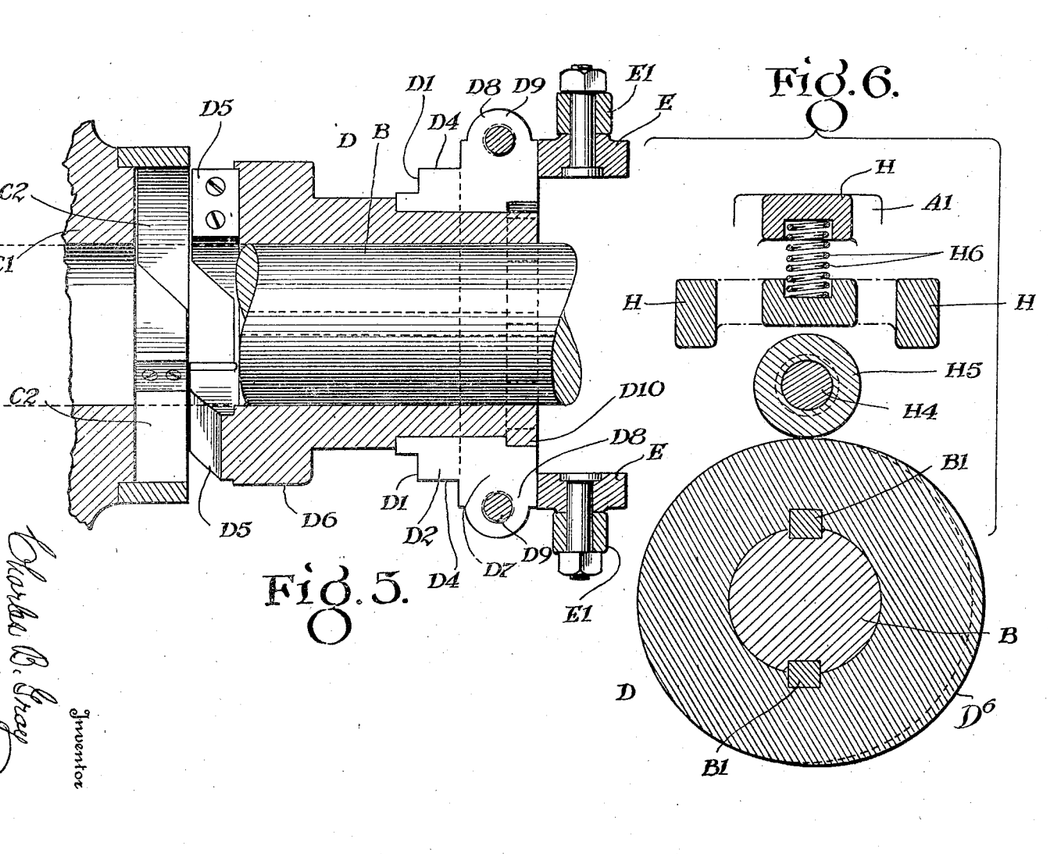
Fig. 5 is a horizontal section on the line, 5—5, of Figs. 2 and 3, parts being added at the left.
Fig. 6 is an upright section on the line, 6—6, of Fig. 3, looking toward the right.
Figure 7:
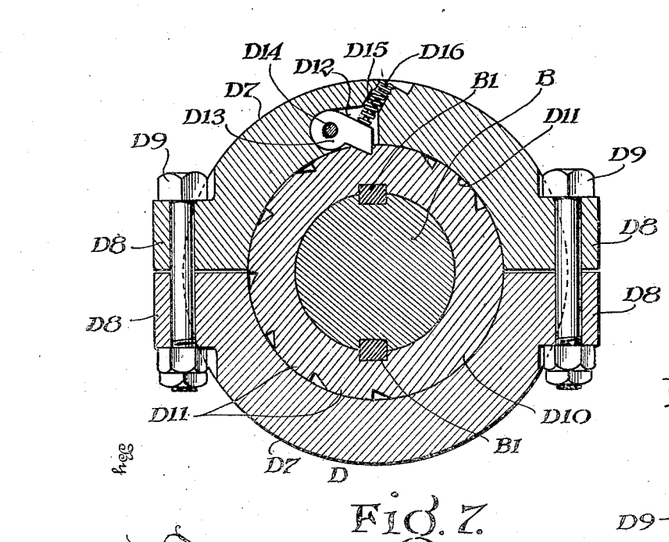
Fig. 7 is an upright section on the line, 7—7, of Fig. 3, looking toward the right.
Figure 8:
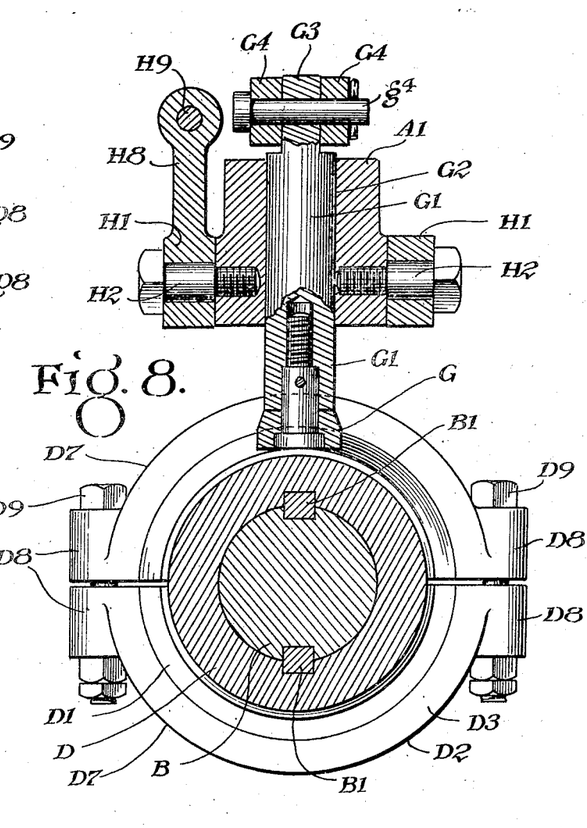
Fig. 8 is an upright section on the line, 8—8, of Fig. 3, looking toward the right.
Figures 9, 10, 11:
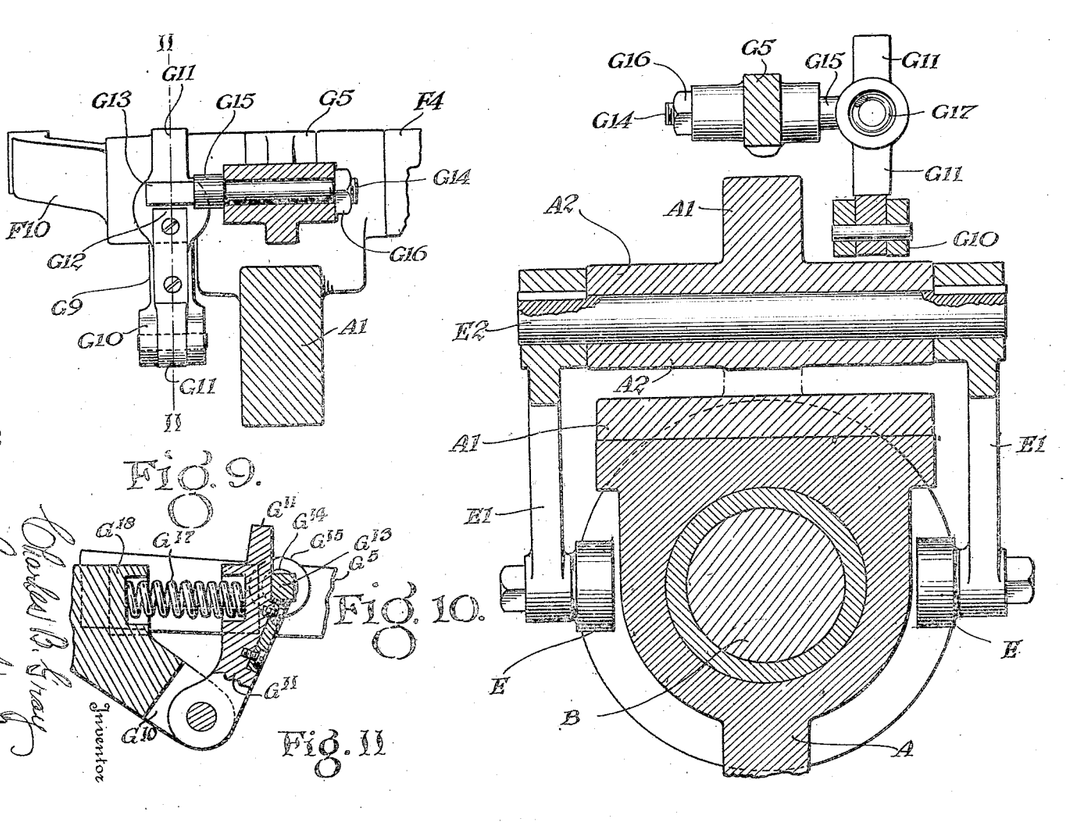
Fig. 9 is an upright section on the line, 9—9, of Figs. 2 and 3, looking toward the left in Fig. 2 and looking toward the right in Fig. 3.
Fig. 10 is an upright section on the line, 10—10, of Figs. 2 and 3, looking in the directions of the arrows.
Fig. 11 is an upright section on the line, 11—11, of Fig. 9, looking toward the right.
Figure 12:
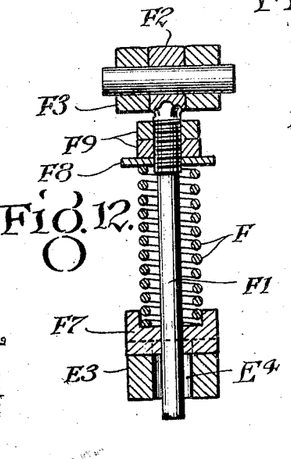
Fig. 12 is a section on the line, 12—12, of Fig. 3, looking toward the left.
Figure 13:
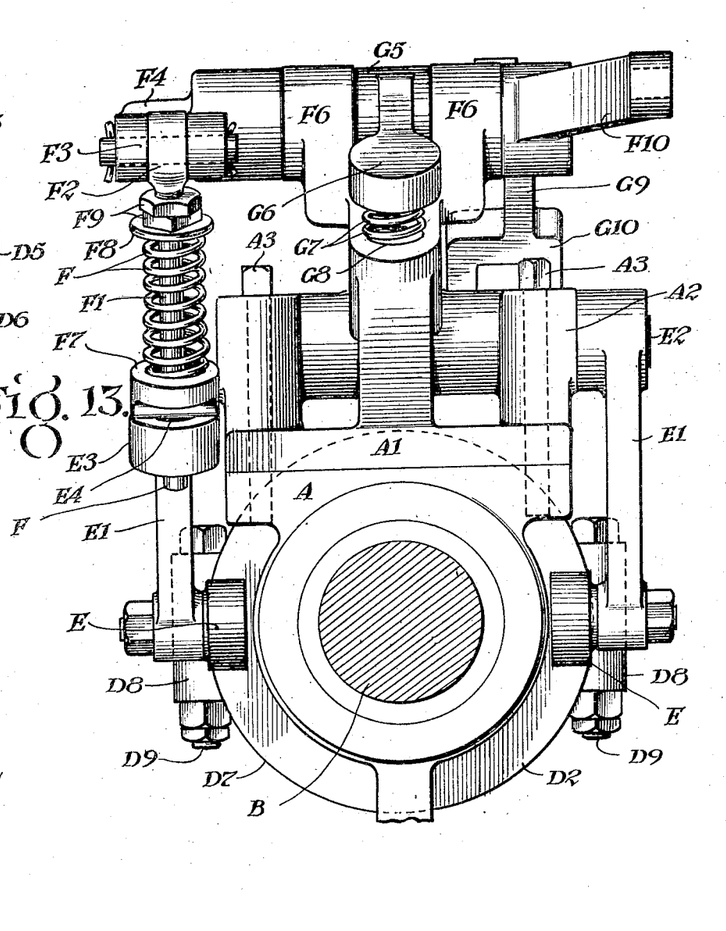
Fig. 13 is an elevation looking at the clutch mechanism from the left as shown in Fig. 2 and from the right as shown in Fig. 3.
Figure 14:
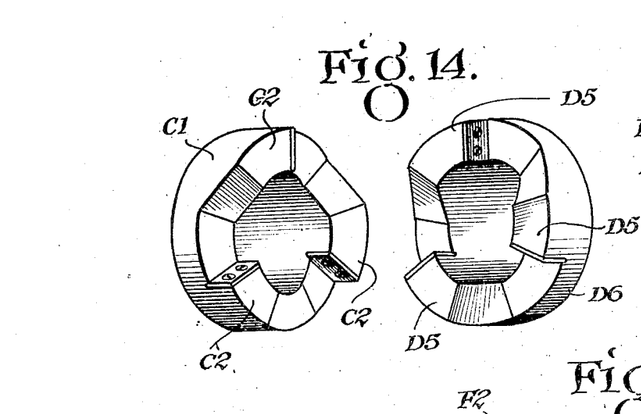
Fig. 14 is a perspective showing the opposing faces of the two clutch members.

The normal position of the parts of the mechanism is as shown in Figs. 1, 2 and 3, the secondary clutch member, D, being in its rear position and disengaged from the clutch member, C¹, and held in that position by the roller, G, bearing against the annular shoulder, D¹; it being remembered that the spring, F, constantly tends to depress the arm, E³, for straining the rock shaft, E², and pressing the arms, E¹, toward the clutch member, D, whereby the rollers, E, are constantly yieldingly pressed against the adjacent transverse face of the clutch member, D. It is also to be remembered that this clutch member, D, and the shaft, B, are not now rotating. When the operator desires clutch engagement for producing rotation of the shaft, B, he depresses the pedal, P³, whereby the upright rod, P, is moved downward and causes the downward turning of the arm, F¹⁰, whereby the rock shaft, F⁵, is turned. That causes the upward movement of the arm, G⁹, and the latch member, G¹¹, whereby the stud, G¹³, and the adjacent end of the rocking lever, G⁵, are lifted. Lifting that end of the lever, G⁵, causes the lifting of the stem, G¹, and the roller, G, high enough to release the roller from the annular shoulder, D¹, and also enough higher to be entirely above the cam, D². Thus the roller is entirely out of the way of the shoulder, D¹, and of the cam, D², and the clutch, D, is entirely free for quick forward movement in response to the pressure exerted by the spring, F, through the arm, E³, the arms, E¹, and the rollers, E. Here it is to be noted that the normal pressure of the spring, F, which has already been described has now been augmented by the downward pressure of the arm, F⁴, that arm having been forced downward simultaneously with the downward movement of the arm, F¹, and the rod, P, the arms, F⁴ and F¹⁰, being rigid on the same shaft, F⁵.

If the operator continues the depression of the pedal, the rocking lever, G⁵, will continue to hold the stem, G¹, and the roller, G, in the raised position. That will leave the clutch member, D, in the forward or engaged position for rotation as long as the elevation of the stem, G¹, and the roller, G, is maintained. To terminate the elevation of said stem and roller during one rotation of the clutch member, D, the latch member, G¹¹, is to be pushed away from the stud, G¹³, to bring that stud and the adjacent end of the rocking lever, G⁵, free for downward movement. As above described, the expanding coiled spring, G⁷, at the opposite end of the lever, G⁵, at all times act yieldingly to tilt said lever for the downward movement of the end of said lever which carries the stem, G¹, and the roller, G. This release of the latch, G¹¹, is effected by the tilting of the U-form member, H, whereby the bolt, H⁹, is caused to force the latch member, G¹¹, out of engagement with the stud, G¹³. For the tilting of the U-shape member, H, the perimeter, D⁶, of the member, D, is in the form of a cam adapted to push the roller, H⁵, upward at the time the roller, G, is to descend. Then the roller, G, descends and bears on the face, D⁴, between the shoulder, D¹, and the working face, D³, of the cam member, D². This position of the roller continues until the oblique part of the working face, D³, meets the roller, G. Then further rotation of the clutch member, D, will cause engagement between said oblique face and the roller, G, to force the entire clutch member, D, to move bodily rearward out of engagement with the primary clutch member. The oblique part of the face, D³, becomes even with the annular shoulder, D¹. When that part of the face, D³, reaches the roller, G, said roller slips downward and engages said shoulder and again holds the secondary clutch member against forward movement. Continued depression of the pedal will not change this engagement of the secondary clutch member with the roller, G; for the latch engagement between the arm, G⁹, and the rocking lever, G⁵, remains broken, the stud, G¹³, having moved downward below the shoulder, G¹², of the latch member when the latch member was pushed away from the stud, G¹³. During the time that the pedal remains depressed, the operator may shift or relocate the metal or other material which is to be cut or punched. When the metal has been readjusted ready for another stroke, the operator releases the pedal, whereby the arm, F¹⁰, rises and the arm, G⁹, and the latch member, G¹¹, descend until the shoulder, G¹², is below the level of the lower face of the stud, G¹³, whereupon the spring, G¹⁷, presses the latch member, G¹¹, forward until said shoulder is under the stud, G¹³. This completes the cycle. The next stroke is now effected by again depressing the pedal for the upward movement of the stem, G¹, and the roller, G, whereby the secondary clutch member is again released for quick forward movement into engagement with the primary clutch member, C¹.

I claim as my invention:

1. In a clutch structure, the combination with a primary clutch member and a secondary clutch member each having jaws adapted to engage the jaws of the other clutch member, of means for forcing the secondary clutch member away from the primary clutch member, a pivoted member supporting said forcing means, operator-controlled means for moving said pivoted member to move said forcing means out of action, said operator-controlled means comprising a latch, automatic means for disengaging said latch, and operator-controlled means tending to press the secondary clutch member toward the primary member while said forcing means is being moved out of action, substantially as described.

2. In a clutch structure, the combination with a primary clutch member and a secondary clutch member each having jaws adapted to engage the jaws of the other clutch member, of means for forcing the secondary clutch member away from the primary clutch member, a pivoted member supporting said forcing means, operator-controlled means for moving said pivoted member to move said forcing means out of action, said operator-controlled means comprising a latch, automatic means for disengaging said latch, and operator-controlled means including a hinged member tending to press the secondary clutch member toward the primary member while said forcing means is being moved out of action, substantially as described.

3. In a clutch structure, the combination with a primary clutch member and a secondary clutch member each having jaws adapted to engage the jaws of the other clutch member, of means for forcing the secondary clutch member away from the primary clutch member, a pivoted member supporting said forcing means, operator-controlled means for moving said pivoted member to move said forcing means out of action, said operator-controlled means comprising a latch, pivoted clutch-controlled means for disengaging said latch, and operator-controlled means tending to press the secondary clutch member toward the primary member while said forcing means is being moved out of action, substantially as described.

4. In a clutch structure, the combination with a primary clutch member and a secondary clutch member each having jaws adapted to engage the jaws of the other clutch member, of means for forcing the secondary clutch member away from the primary clutch member, a pivoted member supporting said forcing means, operator-controlled means for moving said pivoted member to move said forcing means out of action, said operator-controlled means comprising a latch, pivoted clutch-controlled means for disengaging said latch, and operator-controlled means including a pivoted member tending to press the secondary clutch member toward the primary member while said forcing means is being moved out of action, substantially as described.

5. In a clutch structure, the combination with a primary clutch member and a secondary clutch member each having jaws adapted to engage the jaws of the other clutch member, of a shaft transverse to the clutch axis, a rocking lever supported by said shaft, clutch forcing means supported by said rocking lever and adapted to engage the secondary clutch member to force the latter away from the primary clutch member, an operator-controlled rocking structure supported on said shaft, latch mechanism placing said rocking structure into operative relation with said rocking lever, automatic means for controlling said latch mechanism, and means placing said rocking structure into operative relation with the secondary clutch member for at the will of the operator pressing the secondary clutch member toward the primary clutch member, substantially as described.

6. In a clutch structure, the combination with a primary clutch member and a secondary clutch member each having jaws adapted to engage the jaws of the other clutch member, of a shaft transverse to the clutch axis, a rocking lever supported by said shaft, clutch forcing means supported by said rocking lever and adapted to engage the secondary clutch member to force the latter away from the primary clutch member, an operator-controlled rocking structure supported on said shaft, latch mechanism placing said rocking structure into operative relation with said rocking lever, automatic means for controlling said latch mechanism, a second rocking structure adapted to be tilted for pressing the secondary clutch member toward the primary clutch member, and elastic means intervening between said two rocking structures whereby at the will of the operator the second rocking structure may be made to press against the secondary clutch member, substantially as described.

7. In a clutch structure, the combination with a primary clutch member and a secondary clutch member each having jaws adapted to engage the jaws of the other clutch member, of means for forcing said secondary clutch member away from the primary clutch member, a pivoted member supporting said forcing means, an operator-controlled pivoted member, latch mechanism intervening between said operator-controlled member and the pivoted member supporting said forcing means, a rocking structure in operative relation with the secondary clutch member and said latch mechanism for controlling the latter, and means intervening between the operator-controlled pivoted member and the secondary clutch member for pressing said clutch member toward the primary clutch member upon the release of said forcing means, substantially as described.

In testimony whereof I have signed my name this 6th day of March, in the year one thousand nine hundred and twenty-three.

CHARLES B. GRAY.